(12) United States Patent
Ran et al.

(10) Patent No.: US 12,546,598 B2
(45) Date of Patent: Feb. 10, 2026

(54) LASER TOOL AND SYSTEM

(71) Applicant: The Stanley Works Israel Ltd., Rosh Ha'Ayin (IL)

(72) Inventors: Amit Ran, Mazkeret Batia (IL); Amit Rotenberg, Kiryat Ono (IL); Ohad Waissengreen, Emek Sorek (IL)

(73) Assignee: The Stanley Works Israel Ltd., Rosh Ha'Ayin (IL)

( * ) Notice: Subject to any disclaimer, the term of this patent is extended or adjusted under 35 U.S.C. 154(b) by 394 days.

(21) Appl. No.: 18/182,475

(22) Filed: Mar. 13, 2023

(65) Prior Publication Data

US 2023/0221117 A1    Jul. 13, 2023

Related U.S. Application Data

(63) Continuation of application No. PCT/EP2021/075249, filed on Sep. 14, 2021.

(30) Foreign Application Priority Data

Sep. 16, 2020   (GB) .................................. 2014590

(51) Int. Cl.
*G01C 15/00*        (2006.01)
(52) U.S. Cl.
CPC .................. *G01C 15/004* (2013.01)
(58) Field of Classification Search
CPC ....... G01C 15/00; G01C 15/02; G01C 15/004
USPC .................................................. 33/286, 290
See application file for complete search history.

(56) References Cited

U.S. PATENT DOCUMENTS

| | | | | |
|---|---|---|---|---|
| 4,830,489 A | * | 5/1989 | Cain | G01C 15/004 |
| | | | | 356/73 |
| 6,028,665 A | * | 2/2000 | McQueen | G01C 15/105 |
| | | | | 33/286 |
| 7,096,591 B2 | * | 8/2006 | Glantz | G01C 15/002 |
| | | | | 33/290 |
| 7,397,014 B2 | | 7/2008 | Hart | |

(Continued)

FOREIGN PATENT DOCUMENTS

| CN | 202953150 U | 5/2013 |
|---|---|---|
| DE | 202006012641 U1 | 12/2006 |

(Continued)

OTHER PUBLICATIONS

WO Int'l Search Report dated, Jan. 4, 2022 in corresponding PCT application No. PCT/EP2021/075249.

*Primary Examiner* — George B Bennett
(74) *Attorney, Agent, or Firm* — Womble Bond Dickinson (US) LLP

(57) ABSTRACT

A laser tool comprises at least one laser emitter, a housing, and a support. The laser emitter is for emitting at least one laser beam from the tool. The housing supports and at least partially contains the laser emitter, and the housing and the laser emitter may comprise a laser unit. The support is external to the housing, for supporting the housing, and the support is adjustable for orienting the housing and thereby orienting and positioning the laser beam. The support preferably is a gimbal support, having at least two, preferably at least three, for example exactly three, non-parallel rotational axes, for adjusting the support to orient the housing and thereby orient the laser beam. A laser tool system may comprise two or more laser units and the support.

25 Claims, 7 Drawing Sheets

(56) References Cited

U.S. PATENT DOCUMENTS

| | | | |
|---|---|---|---|
| 7,418,786 B2 * | 9/2008 | Miyata | G01C 15/004 |
| | | | 33/285 |
| D668,976 S | 10/2012 | Stilz-Stabila | |
| 9,030,149 B1 | 5/2015 | Chen et al. | |
| 9,441,967 B2 * | 9/2016 | Ranieri | G01C 15/06 |
| 9,458,963 B1 | 10/2016 | Choi et al. | |
| 9,765,926 B2 | 9/2017 | Chen et al. | |
| 9,798,221 B2 | 10/2017 | Niemeyer et al. | |
| 9,874,308 B2 | 1/2018 | Saika et al. | |
| 9,904,147 B2 | 2/2018 | Zhao | |
| 9,921,459 B2 | 3/2018 | Wagner et al. | |
| 10,274,129 B2 | 4/2019 | Saika et al. | |
| 10,330,254 B2 | 6/2019 | Chen et al. | |
| 10,359,690 B2 | 7/2019 | Wagner et al. | |
| 10,508,683 B2 | 12/2019 | Chen et al. | |
| 10,545,021 B2 | 1/2020 | Horkey | |
| 10,583,556 B2 | 3/2020 | Niemeyer et al. | |
| 10,642,130 B2 | 5/2020 | Niemeyer et al. | |
| 12,123,543 B2 * | 10/2024 | Kasahara | F16M 11/123 |
| 2002/0092186 A1 * | 7/2002 | Napier | G02B 6/423 |
| | | | 33/286 |
| 2012/0124851 A1 | 5/2012 | Lukic | |
| 2012/0230668 A1 | 9/2012 | Vogt | |
| 2015/0071627 A1 | 3/2015 | Hoang | |
| 2015/0261070 A1 | 9/2015 | Feng et al. | |
| 2015/0285913 A1 * | 10/2015 | Becker | G01S 17/42 |
| | | | 356/5.03 |
| 2016/0341541 A1 * | 11/2016 | Bridges | G01S 7/481 |
| 2018/0149949 A1 | 5/2018 | Kim et al. | |
| 2018/0194490 A1 | 7/2018 | Chen | |
| 2018/0266621 A1 | 9/2018 | Zhang et al. | |
| 2019/0002125 A1 | 1/2019 | Bin et al. | |
| 2019/0079373 A1 | 3/2019 | Wang | |
| 2019/0108412 A1 | 4/2019 | Wang et al. | |
| 2019/0113922 A1 | 4/2019 | Koyama et al. | |
| 2019/0219221 A1 | 7/2019 | Espersen et al. | |
| 2019/0226636 A1 | 7/2019 | Saika et al. | |
| 2019/0235357 A1 | 8/2019 | Huang et al. | |
| 2019/0235358 A1 | 8/2019 | Huang et al. | |
| 2019/0264864 A1 | 8/2019 | Chen et al. | |
| 2019/0339594 A1 | 11/2019 | Wang et al. | |
| 2019/0339597 A1 | 11/2019 | Wagner et al. | |
| 2019/0373173 A1 | 12/2019 | Wang et al. | |
| 2020/0041878 A1 | 2/2020 | Lan et al. | |
| 2020/0050087 A1 | 2/2020 | Su et al. | |
| 2020/0074675 A1 | 3/2020 | Cejka et al. | |
| 2020/0116195 A1 | 4/2020 | Chen et al. | |
| 2020/0133101 A1 | 4/2020 | Su et al. | |
| 2020/0166340 A1 | 5/2020 | Hinderling | |
| 2020/0256506 A1 | 8/2020 | Su | |

FOREIGN PATENT DOCUMENTS

| | | |
|---|---|---|
| DE | 102006000359 A1 | 1/2008 |
| DE | 102013205633 A1 | 10/2013 |
| DE | 202015104758 U1 | 10/2015 |
| DE | 102011077080 B4 | 8/2017 |
| EP | 1136789 A2 | 9/2001 |
| EP | 1235051 A2 | 8/2002 |
| EP | 1409958 A1 | 4/2004 |
| EP | 1461848 A2 | 9/2004 |
| EP | 1564524 A2 | 8/2005 |
| EP | 1733186 A1 | 12/2006 |
| EP | 1860400 A1 | 11/2007 |
| EP | 1681534 B1 | 3/2008 |
| EP | 1376056 B1 | 2/2011 |
| EP | 2327958 A1 | 6/2011 |
| EP | 2411761 B1 | 12/2012 |
| EP | 1357353 B1 | 7/2013 |
| EP | 2057440 B1 | 7/2013 |
| EP | 2618104 A1 | 7/2013 |
| EP | 2696167 A1 | 2/2014 |
| EP | 1692461 B1 | 11/2014 |
| EP | 2056067 B1 | 12/2014 |
| EP | 2411763 B1 | 4/2015 |
| EP | 2930465 A1 | 10/2015 |
| EP | 2934821 A1 | 10/2015 |
| EP | 2527786 B1 | 3/2016 |
| EP | 2411764 B1 | 4/2016 |
| EP | 2411762 B1 | 11/2016 |
| EP | 3087344 B1 | 11/2016 |
| EP | 2343498 B1 | 3/2017 |
| EP | 2534443 B1 | 4/2017 |
| EP | 3236204 A2 | 10/2017 |
| EP | 2310800 B1 | 3/2018 |
| EP | 2998075 B1 | 4/2018 |
| EP | 3418687 A1 | 12/2018 |
| EP | 2781880 B1 | 1/2019 |
| EP | 3425334 A1 | 1/2019 |
| EP | 3482157 A1 | 5/2019 |
| EP | 3088842 B1 | 7/2019 |
| EP | 2560724 B1 | 9/2019 |
| EP | 2383543 B1 | 10/2019 |
| EP | 3364095 B1 | 10/2019 |
| EP | 3605017 A1 | 2/2020 |
| GB | 2383138 B | 7/2006 |
| GB | 2427917 A | 1/2007 |
| GB | 2429286 A | 2/2007 |
| JP | 2010257742 A | 11/2010 |
| WO | 2017149488 A1 | 9/2017 |
| WO | 2018034734 A1 | 2/2018 |
| WO | 2019084709 A1 | 5/2019 |
| WO | 2019196093 A1 | 10/2019 |
| WO | 2020073219 A1 | 4/2020 |
| WO | 2020087392 A1 | 5/2020 |

* cited by examiner

LASER TOOL AND SYSTEM

CROSS-REFERENCE TO RELATED APPLICATIONS

This application is a continuation application of WO Application No. PCT/EP2021/075249 filed Sep. 14, 2021, which claims priority under 35 U.S.C. § 119, to UK Patent Application No. GB2014590.0 filed Sep. 16, 2020, both of which are incorporated herein by reference in their entireties.

FIELD OF THE INVENTION

The present invention relates to laser tools, e.g., laser levels, laser distance measurers, laser rangefinders, laser measuring scanners, LIDAR tools, and the like.

BACKGROUND OF THE INVENTION

The invention seeks to provide improved laser tools, and an improved laser tool system, in terms of functionality, versatility and ease of use, for example.

BRIEF SUMMARY OF THE INVENTION

A first aspect of the invention provides a laser tool, comprising at least one laser emitter, for emitting at least one laser beam from the tool; a housing, supporting and at least partially containing the laser emitter; and a support external to the housing, for supporting the housing, wherein the support is adjustable for orienting the housing to orient and position the laser beam.

A second aspect of the invention provides a laser tool system comprising a laser tool and at least a second laser unit. The laser tool includes at least one laser emitter, for emitting at least one laser beam from the tool; a housing, supporting and at least partially containing the laser emitter; and a support external to the housing, for supporting the housing, wherein the support is adjustable for orienting the housing to orient and position the laser beam. The at least one laser emitter and the housing comprise a first laser unit, and wherein the first laser unit and the support are configured to enable the first laser unit to be detachably mounted to the support. The at least a second laser unit includes at least one second laser emitter for emitting at least one laser beam from the second laser unit; and a second housing, supporting and at least partially containing the second laser emitter. The second laser unit and the support are configured to enable the second laser unit to be detachably mounted to the support.

Preferred, and other optional, features of the invention are defined and described in the dependent claims.

Accordingly, the first aspect of the invention provides a laser tool, comprising: (a) at least one laser emitter, for emitting at least one laser beam from the tool; (b) a housing, supporting and at least partially containing the laser emitter; and (c) a support external to the housing, for supporting the housing, wherein the support is adjustable for orienting the housing and thereby orienting and positioning the laser beam.

The, or each, laser emitter preferably comprises a laser diode. The, or each, laser emitter may, for example, comprise an assembly comprising a laser diode and at least one optical component, e.g., a lens, preferably a collimating lens. The, or each, laser emitter assembly may include an enclosure which holds the laser diode and the, or each, optical component, and which includes at least one opening to allow the laser beam to be emitted from the assembly.

The housing preferably fully contains the, or each, laser emitter, e.g., the, or each, laser emitter assembly. The housing preferably includes one or more windows to allow the, or each, laser beam to be emitted from the housing. Additionally or alternatively, at least one laser emitter may extend at least partially outside of the housing, for example in order to be able to rotate with respect to the housing, preferably for embodiments of the invention in which the laser tool is a rotary laser tool. The housing preferably is formed from plastics material.

The support may be a gimbal support, for example. The support preferably has at least two, more preferably at least three, even more preferably exactly three, non-parallel rotational axes, for adjusting the support to orient the housing and thereby orient and position the laser beam. The non-parallel rotational axes preferably are mutually substantially perpendicular.

The adjustment of the support to orient the housing and thereby orient and position the laser beam preferably is configured to be by means of: substantially horizontal rotation about a substantially vertical axis (e.g. panning between left and right, otherwise known as "yaw") and/or substantially vertical rotation about a substantially horizontal axis (e.g. tilting between up and down; otherwise known as "pitch") and/or substantially twisting rotation about a substantially horizontal axis (e.g. rolling clockwise or anti-clockwise).

The housing and the support preferably are configured to enable the housing to be detachably mounted to the support.

The support preferably comprises at least one arm, and more preferably comprises a single arm. For example, the support may comprise a gimbal arm, and/or robotic arm, and/or a stabilizer arm. A support in the form of a stabilizer, (either in the form of a single arm, or otherwise), preferably is configured to stabilize the housing against vibrations and/or impacts.

The support preferably is manually adjustable and/or adjustable by electrical power (e.g., by means of a power source and one or more motors, as described below), to orient the housing and thereby orient and position the laser beam(s).

The support preferably further comprises a base, from which the arm extends, preferably pivotably.

Preferably, the housing is mountable or mounted at an opposite end region of the arm to the base, preferably by means of a mounting portion of the arm.

The support preferably comprises a jointed arm, at least one joint of the arm comprising a pivot enabling relative rotation between two sections of the arm about a respective rotational axis. Advantageously, the arm may have two or more such joints, for example.

For example, the support may comprise a base from the which the jointed arm of the support extends, and wherein the jointed arm is joined to the base by means of a pivot enabling relative rotation between the jointed arm and the base about a respective rotational axis, preferably a substantially vertical axis.

At least one, and preferably each, pivot preferably is powered, preferably by means of a motor, such that the relative rotations are powered.

The, or each, powered pivot may comprise a motor, preferably a brushless and/or electronically commutated motor. The, or each, motor preferably is housed within the support.

The support, or at least the structural and/or weight-bearing parts thereof, preferably is/are formed from a plastics material; however, the support may additionally or alternatively comprise metal, for example.

The laser tool of the invention preferably further comprises one or more accelerometers and/or gyroscopes, and/or at least one inertial measurement unit (IMU), configured to enable the orientation of the laser beam, e.g., with respect to gravity. Preferably, at least one said accelerometer and/or gyroscope and/or inertial measurement unit is located in or on the arm and/or the housing. Preferably, for embodiments in which the support comprises an arm, at least one accelerometer and/or gyroscope, and/or at least one inertial measurement unit (IMU), is located in or on the arm at an opposite end region of the arm to the base. Advantageously, at least one accelerometer and/or gyroscope, and/or at least one inertial measurement unit (IMU), is located in or on at least one pivot of the arm.

The laser tool preferably further comprises at least one microprocessor, preferably located in the support and/or the housing, configured to control the adjustment of the support to orient the laser beam utilizing orientation and/or movement information provided by the at least one accelerometer and/or gyroscope and/or inertial measurement unit.

The laser tool preferably further comprises one or more human-usable controls for controlling and/or setting the adjustment of the support and/or for controlling the laser emitter. The, or each, control may be located on the support, preferably on the base, and/or on the housing, and/or comprises a remote control, e.g., in the form of a software application installed on a mobile device, preferably configured to communicate with the remainder of the tool via wireless electromagnetic wave communication, e.g., Bluetooth. The remote control (where present) may be removably attached, or attachable, to the support, preferably the base.

The laser tool preferably further comprises at least one power source, preferably at least one battery pack and/or battery cell, mounted or mountable therein or thereon. Advantageously, a single power source may be configured to power both the laser emitter and the, or each, pivot, for example. The power source preferably is mounted in, or mountable on, the support, preferably the base, and preferably is removably so mounted or mountable.

The remote control (where present) preferably includes a chargeable battery which is configured to be chargeable by the power source when the remote control is attached to the support and the power source is mounted in or on the support.

In some embodiments of the invention, the base of the support may comprise or include a handle, by which the laser tool may be held, e.g., for positioning and/or using and/or carrying the tool. The base may be configured for supporting the tool on a surface, e.g., via a bottom surface, or one or more legs and/or via an attachment configured to attach the tool to a tripod or bracket or other mount, for example.

In preferred embodiments of the invention, the laser tool comprises a laser level. The laser level preferably is a spot (point) laser and/or a line laser and/or a rotary laser, configured to emit one or more laser beams to project one or more laser spots and/or laser lines on external surfaces, e.g., walls and/or floors and/or ceilings. For example, the, or each, laser emitter may include a substantially cylindrical lens or a substantially conical reflector, to project one or more laser lines on external surfaces. Alternatively or additionally, at least one laser emitter may be configured to rotate or oscillate, or to emit a laser beam onto a rotating or oscillating reflector, by means of at least one motor of the laser tool, to project one or more laser lines on external surfaces.

The laser level preferably is configured to emit one or more laser beams in horizontal and/or vertical orientations with respect to gravity.

Additionally or alternatively, the laser tool, e.g., laser level, may be configured to emit one or more laser beams at any predetermined and/or adjustable orientation with respect to gravity.

Because the support enables the orienting and positioning of the laser beams(s) emitted from the housing, in at least some embodiments of the invention the housing and its content can be relatively simple, small and lightweight, for example. In at least some preferred embodiments of the invention, the housing does not include a pendulum for alignment of the laser beam(s) with respect to gravity. For example, the housing may include substantially only the laser emitter(s) and electrical conductors to provide electrical current to the emitter(s), and optionally any other electronic and/or optical device(s), e.g., one or more cameras and/or electronic circuitry (e.g., one or more microprocessors and/or one or more accelerometers). However, in other embodiments of the invention, the housing may include a pendulum for alignment of the laser beam(s) with respect to gravity.

In some preferred embodiments of the invention, the laser tool may additionally or alternatively comprise a laser distance measurer (LDM) and/or a laser rangefinder and/or a LIDAR tool and/or a laser scanner, for example.

In at least some preferred embodiments of the invention, the laser tool may include a camera in or on the housing and/or the support.

In at least some preferred embodiments of the invention, the laser tool may be configured to measure and/or scan and/or map a room or other space.

In at least some preferred embodiments of the invention, the laser tool may be configured to track motion external to the laser tool, e.g., by means of a camera of the laser tool, and/or to stabilize motion of the laser tool.

In at least some preferred embodiments of the invention, the laser tool is programmable. For example, in some embodiments of the invention, the laser tool may be programmable for setting and/or saving specific orientations and/or movements of the housing and/or specific orientations and/or positions and/or movements of the laser beam(s). In some programmable or programmed movements, one or more pivots may not rotate (e.g., they may be "locked-out" from rotation), for example to enable rotations about only one or two axes, especially for purely horizontal or purely vertical rotations.

In at least some preferred embodiments of the invention, the at least one laser emitter and the housing comprise a laser unit (e.g., a first laser unit), and wherein the laser unit and the support are configured to enable the laser unit to be detachably mounted to the support.

Preferably, the laser unit does not include a pendulum for alignment with respect to gravity.

The third aspect of the invention provides a laser tool system, comprising: (a) a first laser unit, comprising: at least one first laser emitter for emitting at least one laser beam from the first laser unit; and a first housing, supporting and at least partially containing the first laser emitter; (b) at least a second laser unit, comprising: at least one second laser emitter for emitting at least one laser beam from the second laser unit; and a second housing, supporting and at least partially containing the second laser emitter; and (c) a support, for selectively supporting one of each of the first and second laser units, wherein the support is adjustable for orienting the housing of the supported laser unit and thereby orienting and positioning the emitted laser beam in use; and wherein the laser units and the support are configured to enable the laser units to be selectively detachably mounted to the support.

The first laser unit and the second laser unit preferably are different to each other.

The laser tool system according to the second and/or third aspect of the invention enables, for example, one of a plurality of laser units, preferably different types of laser unit, of the system to be detachably mounted to the support at any one time, depending on the specific user needs at that time. Because the support enables the orienting and positioning of the laser beams(s) emitted from the supported laser unit, each laser unit can be relatively simple, small, and lightweight, for example. As indicated above, in at least some preferred embodiments of the invention, the laser units do not include a pendulum for alignment with respect to gravity. For example, the laser units may include substantially only the laser emitter(s) and electrical conductors to provide electrical current to the emitter(s), and optionally any other electronic and/or optical device(s), e.g., one or more cameras and/or electronic circuitry (e.g., one or more microprocessors).

Advantageously, the laser tool system preferably further comprises at least a third laser unit, preferably different to each of the first and second laser units, comprising at least one third laser emitter for emitting at least one laser beam from the third laser unit; and a third housing, supporting and at least partially containing the third laser emitter; wherein the third laser unit and the support are configured to enable the third laser unit to be detachably mounted to the support.

Advantageously, each laser unit of the laser tool system may comprise a laser unit selected from: a spot-laser unit; a line-laser unit; a cross-line laser unit; a combination spot- and line-laser unit; a 360 degrees line-laser unit; a rotary-laser unit; an oscillating-laser unit; a red-laser unit; a green-laser unit; a laser distance measurer (LDM) laser unit; a laser-scanner laser unit.

BRIEF DESCRIPTION OF THE DRAWINGS

Embodiments of the invention will now be described, by way of example, with reference to the accompanying drawings, of which.

DETAILED DESCRIPTION OF THE INVENTION

Figure 1:
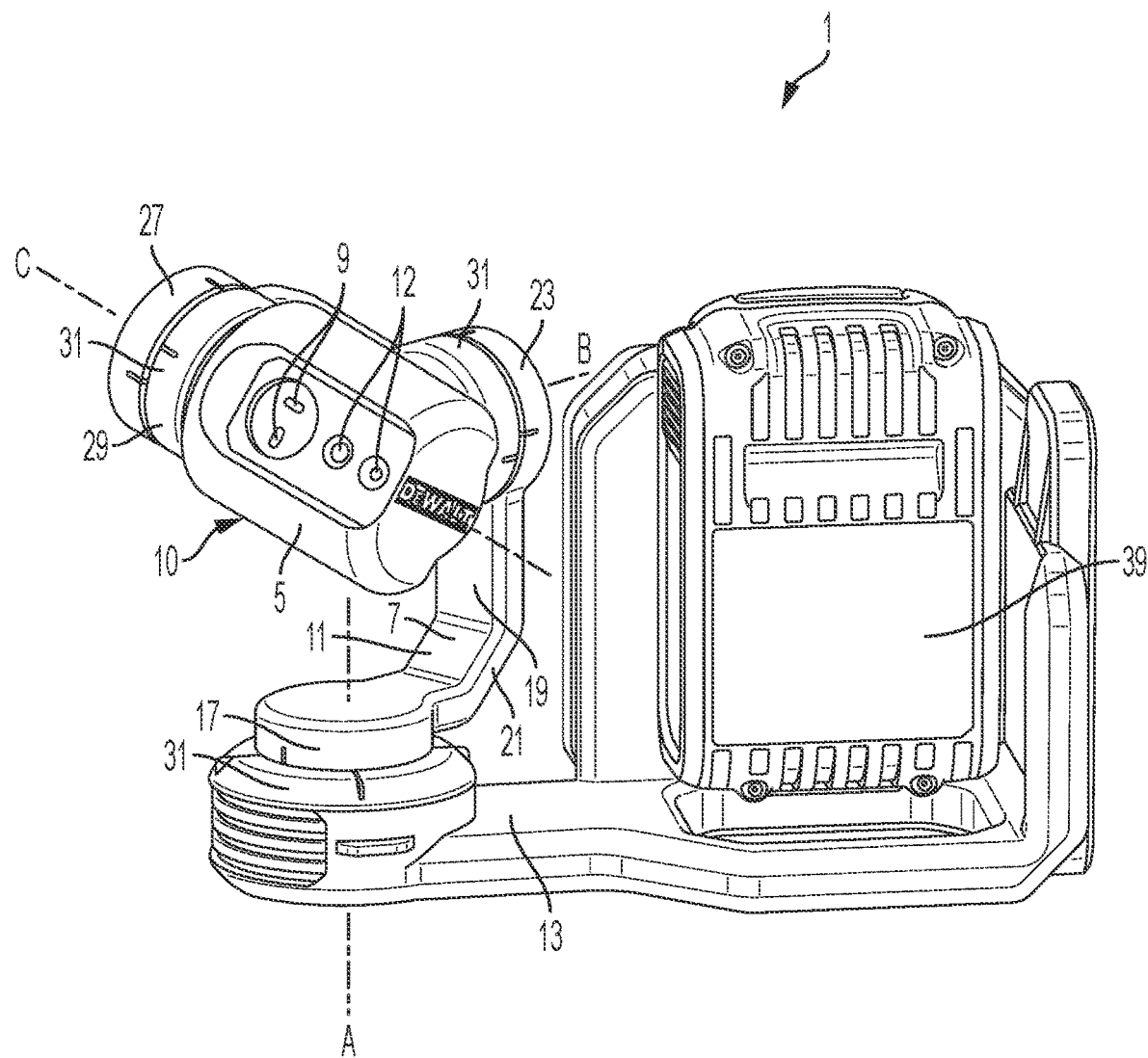
FIG. 1 shows a first embodiment of a laser tool according to the invention.
Figure 2:
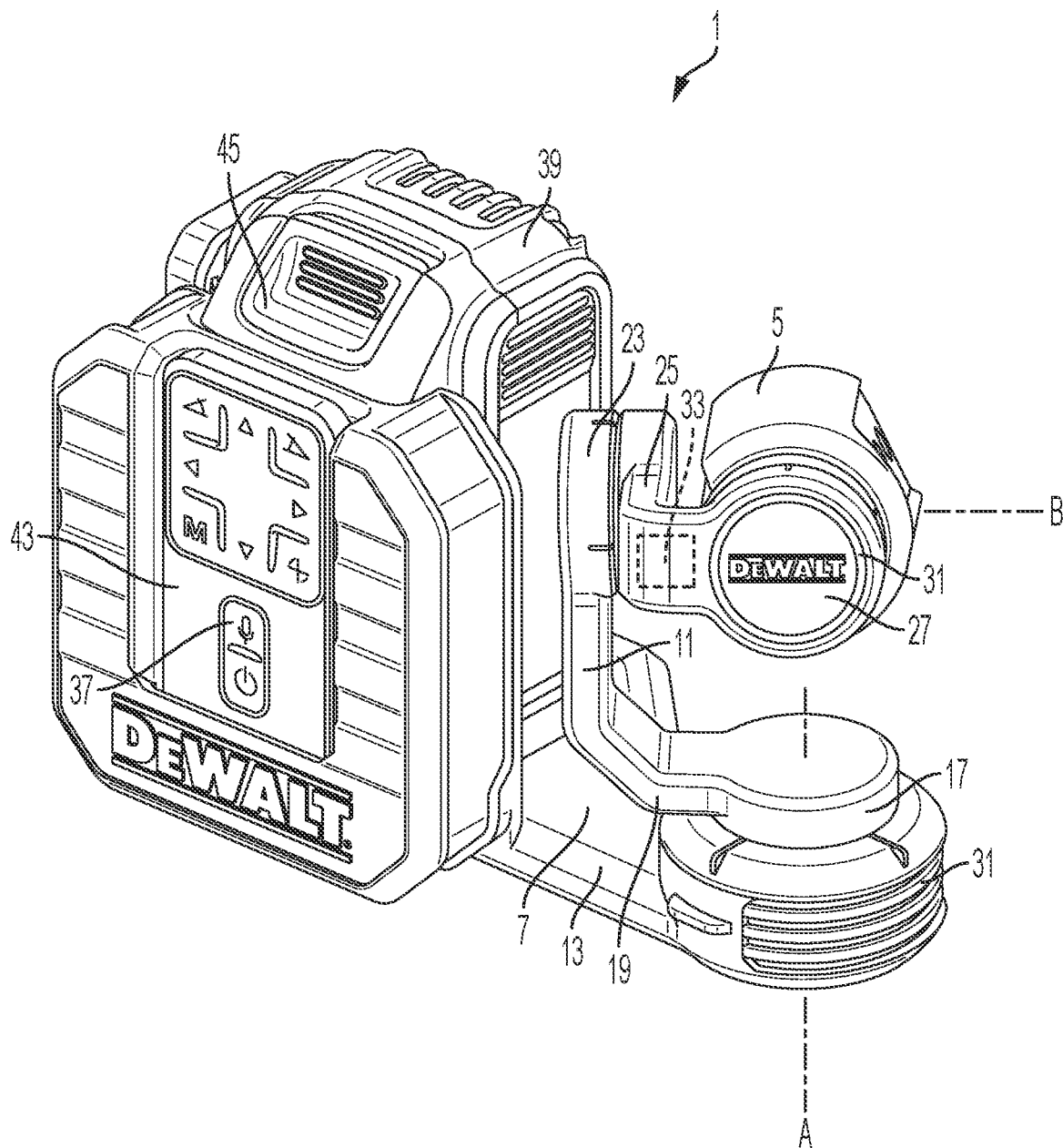
FIG. 2 shows a second view of the first embodiment of a laser tool, of FIG. 1.
Figure 3:
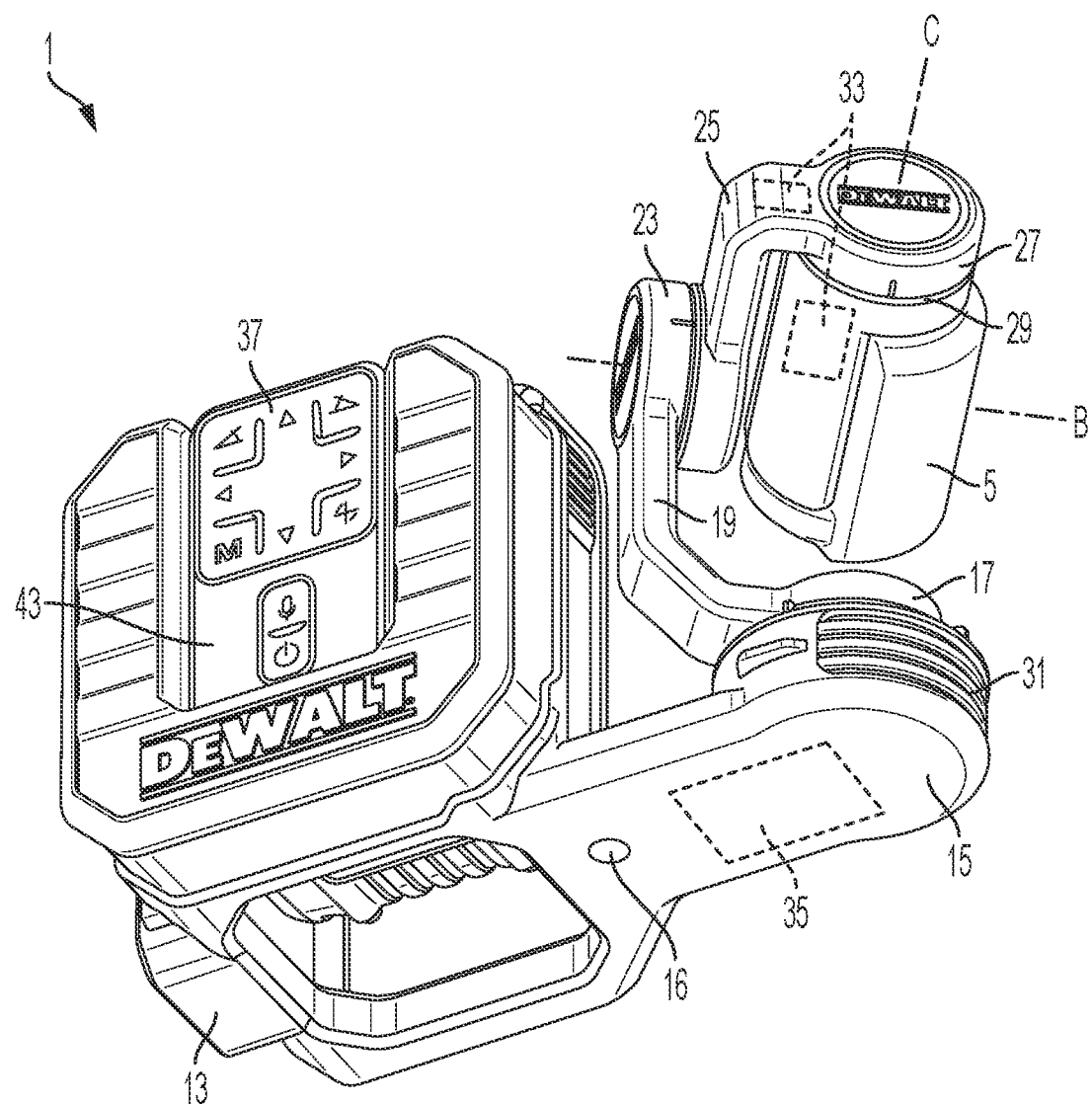
FIG. 3 shows a third view of the first embodiment of a laser tool, of FIG. 1.
Figure 4:
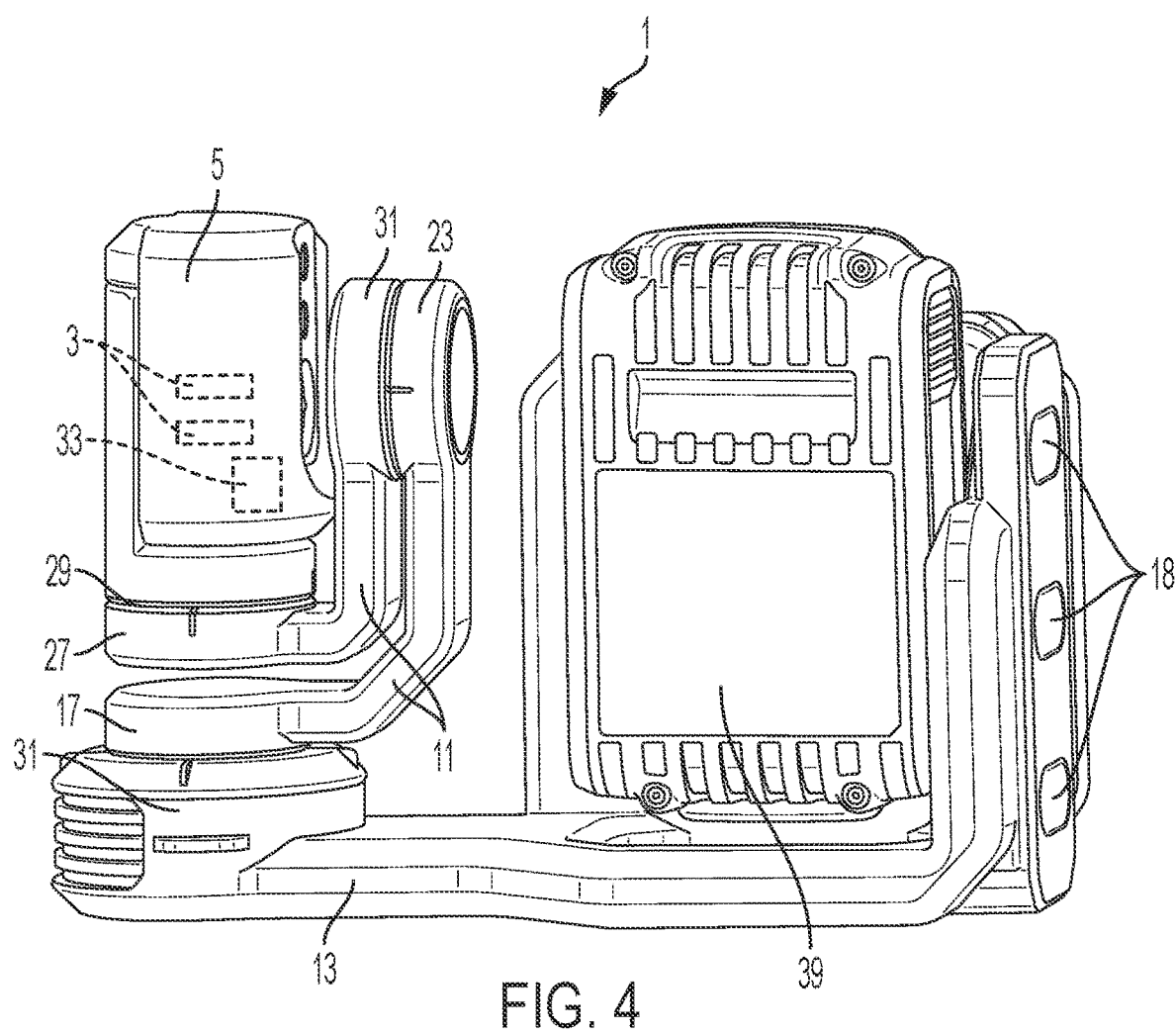
FIG. 4 shows a fourth view of the first embodiment of a laser tool, of FIG. 1.

In the figures and the following description, the same, or functionally the same or similar, features share the same reference numerals. FIGS. 1, 2, 3 and 4 show four views of a first exemplary embodiment of a laser tool 1 according to the invention. (For clarity, reference is also made to some features illustrated in FIGS. 5, 6 and 7, which show second and third exemplary embodiments of laser tools 1 according to the invention.) The laser tool 1 of the first exemplary embodiment includes at least one laser emitter 3, and preferably a plurality of laser emitters 3, as schematically shown in FIG. 4, for emitting either one or two laser beam(s) 2 from the tool, as described in more detail below. (The laser beams are not illustrated in FIGS. 1 to 4, but are schematically illustrated in FIG. 7.) The laser tool 1 also includes a housing 5 which supports and contains the laser emitter(s) 3. The laser tool 1 further includes a support 7 which is external to the housing 5, and which is configured to support the housing. As described in detail below, and as shown in the figures, the support 7 is adjustable for orienting the housing 5 and thereby orienting and positioning the laser beam(s) 2. The housing 5 and laser emitter(s) 3 together comprise a laser unit 10.

The, or each, laser emitter 3 comprises at least a laser diode, and preferably comprises an assembly comprising a laser diode and at least one or more optical components, preferably including at least a collimating lens. In at least some embodiments of the invention, the, or each, laser emitter 3 may, for example, include a generally cylindrical lens or a generally conical reflector, configured to convert a "spot" cross-section laser beam into a "line" cross-section laser beam, thereby to project a laser line (at the desired orientation, e.g., horizontal or vertical, or another orientation) against an external surface. The, or each, laser emitter assembly generally includes an enclosure which holds the laser diode and the optical component(s), and which includes at least one opening to allow the laser beam to be emitted from the assembly. In the example embodiments of the invention shown in the figures, the housing fully contains the, or each, laser emitter 3. However, in other embodiments of the invention, the, or each, laser emitter 3 may, for example, partially extend out of the housing, depending on design and use requirements, e.g., for those embodiments where the laser tool is a rotary laser. The laser emitter(s) 3 will not be described in further detail, because they are well known and used by persons skilled in the art of laser tools.

As already indicated, the first embodiment of the invention shown in FIGS. 1 to 4 includes two laser emitters 3, configured to project mutually perpendicular laser lines 4 and 8 (e.g., as illustrated in FIG. 7 for the third embodiment of the invention). For this purpose, the laser emitters 3 of the first embodiment each include a cylindrical lens, and the housing 5 includes two mutually perpendicular elongate windows 9 to allow the two laser beams to be emitted from the tool. During use, both laser beams 2 may be emitted at the same time, to project a cross of two lines 4 and 8 on a wall 6 or other surface, or the user may choose to have only one laser beam 2 emitted, to generate a single laser line 4 or 8, for example. The housing 5 may optionally include one or more cameras and/or laser distance measurers (LDMs), indicated by reference numeral 12.

The illustrated support 7 is a gimbal support, in the form of a single jointed arm 11 which pivotably extends from a base 13 of the support. The base 13 includes a bottom surface 15 on which the laser tool 1 may be supported on a surface. The bottom surface 15 of the base 13 also includes a conventional attachment aperture 16 to enable the support 7, and hence the laser tool 1, to be mounted on a tripod or other bracket or mount (not shown). Additionally, the base 13 includes magnets 18, for attaching the base to a ferrous metal mount or other structure. The base 13 may also function as a handle or holder for holding the laser tool 1 during use and/or for positioning/orienting the tool and/or for carrying the tool.

The jointed arm 11 of the support 7 is joined to the base 13 by means of a first pivot 17 which enables relative rotation between the jointed arm 11 and the base 13 about a first rotational axis A. Rotational axis A is preferably (but not always necessarily) generally or substantially vertical in use. A first section 19 of the jointed arm extends generally upwardly from the first pivot 17 via a bent section 21. A distal end of the first section 19 of the arm 11 comprises a second pivot 23, having a second rotational axis B. A second section 25 of the arm 11 extends from the second pivot 23 to a distal end region of the second section 25, which has a third pivot 27. Third pivot 27 has a third rotational axis C, about which a mounting portion 29 of the arm is able to rotate, in use. The mounting portion 29, which for example may comprise one or more clips and/or detents and/or magnets (not shown), is configured to enable the detachable mounting of the housing 5 to the support 7.

Each of the pivots 17, 23 and 27 includes a motor 31 housed within the support 7, preferably an electronically commutated brushless motor, configured to power the respective relative rotations about the axes A, B and C, in use, to adjust the support 7 to orient the housing 5 and thereby to orient and position the laser beam(s) 2. Optionally, the pivots may also be rotated manually, thereby to adjust the support manually to orient the housing 5, to orient and position the laser beam(s) 2. The rotational axes A, B and C are generally approximately perpendicular to each other during use, but it is not generally essential that the axes are exactly perpendicular to each other. All that is necessary, regarding the orientations of the rotational axes for this type of embodiment of support 7, is that the rotational axes of the support 7 are mutually oriented, and there is the range of rotations of the pivots, such that the full desired range of orientations and projected positions of the laser beam(s) 2 (for any particular requirement) is possible.

The adjustment of the support 7 to orient the housing 5 and thereby orient and position the laser beam preferably is configured to be by means of: generally or substantially horizontal rotation about a generally or substantially vertical axis (e.g. panning between left and right); and/or generally or substantially vertical rotation about a generally or substantially horizontal axis (e.g. tilting between up and down) and/or generally or substantially twisting rotation about a generally or substantially horizontal axis (e.g. rolling clockwise or anti-clockwise). However, the preferred motions of panning and/or tilting and/or rolling of the mounting portion 29 and the housing 5, in order to arrive at the desired orientation and position of the emitted laser beam(s) may, at least in some embodiments of the invention, be carried out by a combination of motions, to arrive at a resultant movement.

The laser tools of the invention preferably further comprise one or more accelerometers and/or gyroscopes, and/or at least one inertial measurement unit (IMU, generally comprising at least one accelerometer and at least one gyroscope), configured to enable the orientation of the laser beam(s), e.g., with respect to gravity. Such accelerometer(s) and/or gyroscope(s) and/or IMU(s) preferably, therefore, comprise at least part of a control system of the laser tool, for controlling the adjustment of the support, and therefore the orientation of the housing, and thus, the position and orientation of the emitted laser beam(s). Preferably, at least one accelerometer and/or gyroscope and/or inertial measurement unit is located in or on the arm and/or the housing. For example, the embodiment shown in FIGS. 1 to 4 includes accelerometer units 33 in the second section 25 of the arm 11 and in the housing 5. However, other locations for one or more accelerometers are possible, for determining orientations with respect to gravity, as will be understood by the skilled person. The accelerometer units 33 may comprises a plurality of accelerometers, e.g., three mutually perpendicular accelerometers.

Additionally or alternatively, the rate and/or degree of rotation of each pivot of the supports of laser tools of the invention may be measured and/or controlled in order to control the adjustment of the support, and therefore the orientation of the housing, and thus, the position and orientation of the emitted laser beam(s). For example, for embodiments of the invention (e.g., such as the embodiment shown in FIGS. 1 to 4) in which each pivot includes a motor 31, especially a brushless and/or electronically commutated motor 31, the adjustment of the support 7 may be controlled by means of the degrees (amounts) of rotation of each motor 31. Such degrees of rotation may, for example, be measured and controlled by means of Hall Effect sensors (not shown), or other known rotational or positional sensors, in or on the motors 31, and/or may be carried out by means of the electronic control of the brushless and/or electronically commutated motors 31, as will be understood by the skilled person.

Laser tools according to the invention preferably also include at least one microprocessor and/or other electronics, preferably located in the support and/or the housing, configured to control the adjustment of the support to orient and position the laser beam(s), for example utilizing orientation and/or movement information provided by at least one accelerometer 33 and/or gyroscope and/or inertial measurement unit and/or rotational or positional sensor (e.g., Hall Effect sensor). For example, the laser tool 1 shown in FIGS. 1 to 4 includes a microprocessor 35 located in the base 13 of the support 7. In at least some preferred embodiments of the invention, the microprocessor 35 is programmable or pre-programmed to carry out any of a variety alignment and/or measurement and/or scanning operations, for example.

As described above, the laser tools of the invention preferably also include at least one power source, preferably at least one battery pack and/or battery cell, mounted or mountable in or on the laser tool. As shown in FIGS. 1 to 4, the base 13 of the embodiment of the invention shown in those figures has a rechargeable and removable power tool battery pack 39 mounted thereon. The support 7, including the base 13, contains electrical conductors configured to electrically connect the battery pack 39 with each electrical power-consuming device of the laser tool 1. The battery pack 39 is of the type configured to power a plurality of different types of power tool, including laser tools 1 according to the present invention, and as illustrated is preferably a "slide" type battery pack, i.e., which has a sliding attachment/detachment motion. The battery pack 39 is configured to power the laser emitters 3 and each pivot motor 31. Additionally, the battery pack 39 is configured to power the microprocessor 35 and/or other electronics in the tool, for example (i.e., the entire tool). The battery pack 39 includes a spring-loaded depressible button 45 for unlatching and removing the battery pack from the base 13.

Laser tools according to the invention preferably also include one or more human-usable controls for controlling and/or setting the adjustment of the support and/or for controlling the laser emitter. The, or each, control may be located on the support, preferably on the base, and/or on the housing, and/or may comprise a remote control, e.g., in the form of a software application installed on a mobile device, preferably configured to communicate with the remainder of the tool via wireless electromagnetic wave communication. For example, the base 13 of the laser tool 1 illustrated in FIGS. 1 to 4 has a remote control device 43 removably attached thereto. The remote control device includes a plurality of controls 37, for switching the laser beam(s) on and off, for orienting the housing 5 so that a vertical and/or horizontal laser line is projected, and for panning and tilting the housing to position the vertical and horizontal laser lines. The controls 37 may be used while the remote control device is attached to the base 13, or the remote control device 43 may be removed from the base 13 so that the laser tool 1 can be controlled remotely. The remote control device 43 is configured to communicate with the support 7 of the laser tool 1 via electromagnetic wave communication, e.g., Bluetooth.

Figure 5:
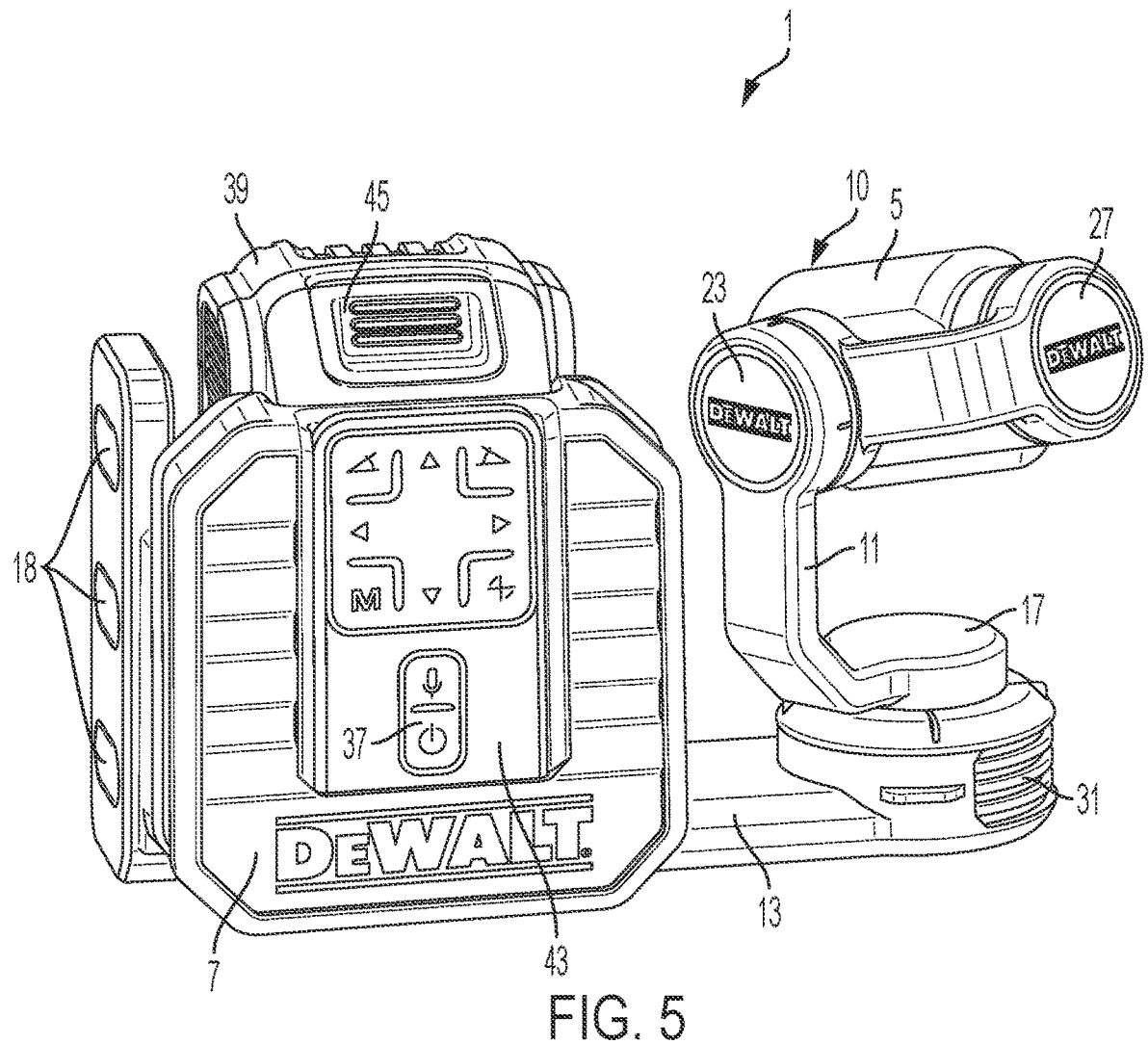
FIG. 5 shows a second embodiment of a laser tool according to the invention, forming part of a laser tool system according to the invention.

As already mentioned, for at least some embodiments of the invention, such as the embodiments shown in FIGS. 1 to 4, 6 and 7, the laser tool 1 is a cross-line laser level, meaning that the laser tool is generally configured to project a vertical laser line and/or a horizontal laser line onto surfaces (such as walls and/or ceilings and/or floors) external to the laser tool. For example, FIG. 7 shows another cross-line laser tool 1 according to the invention, projecting a vertical laser line 4 against a wall 6, and also shows the laser tool 1 projecting a horizontal laser line 8 against the wall 6, to form perpendicular crossed laser lines. However, it is of course necessary to use different types of laser tools for different tasks, and the present invention also provides a laser tool system, for this purpose. FIG. 5 shows a second embodiment of a laser tool 1 according to the invention, comprising the same support 7, battery pack 39 and remote control device 43 as the first embodiment shown in FIGS. 1 to 4, but the laser unit 10 of FIGS. 1 to 4 has been removed from the support 7 and has been replaced with a different laser unit 10. The laser unit 10 of FIG. 5 includes a laser emitter 3 having a conical reflector, for generating a 360 degree laser line. The embodiment of the invention shown in FIGS. 1 to 4, and the embodiment of the invention shown in FIG. 5, together comprise an example of a laser tool system according to the invention, comprising a single support 7, and two different laser units 10 which can be selectively (e.g., alternately or alternatively) mounted on the support 7, depending on requirements.

Figure 6:
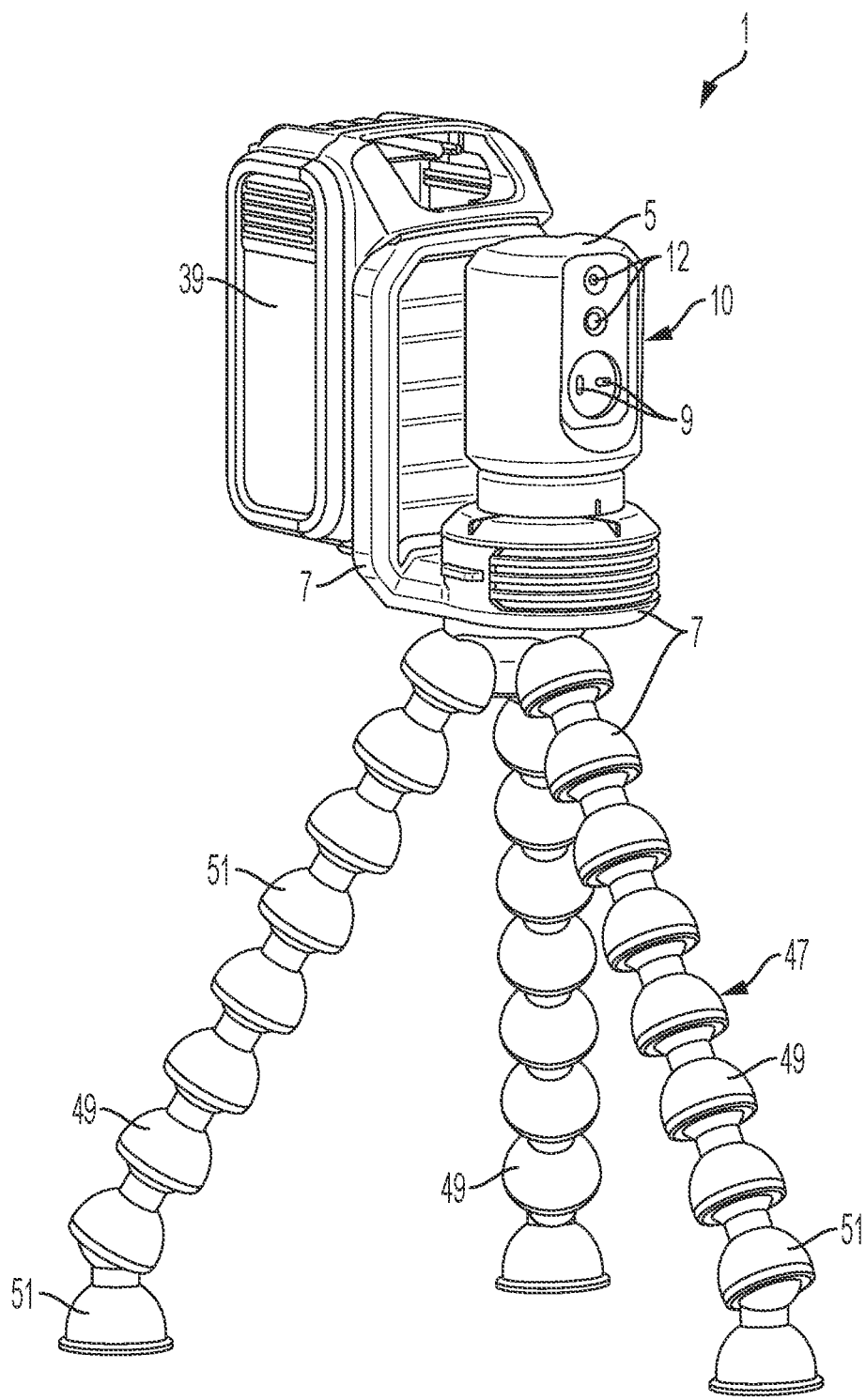
FIG. 6 shows a view of a third embodiment of a laser tool according to the invention.
Figure 7:
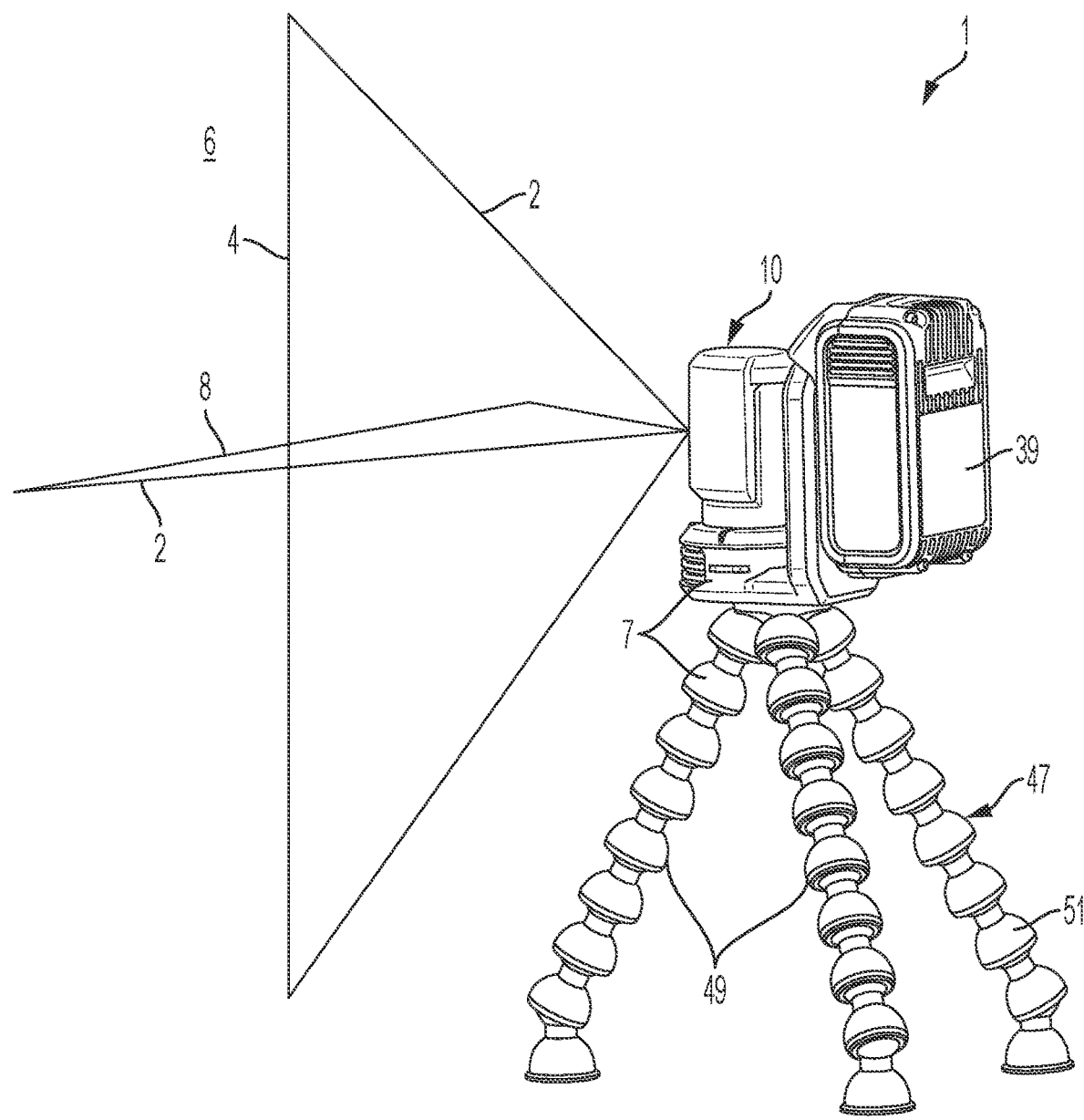
FIG. 7 shows a second view of the third embodiment of a laser tool according to the invention.

FIGS. 6 and 7 show a third embodiment of laser tool 1 the invention, comprising a laser unit 10, a support 7, and a battery pack 39 mounted on the support 7. In this embodiment of the invention, the support 7 includes an adjustable support portion in the form of a manually adjustable tripod 47. In this embodiment, each leg 49 of the tripod 47 comprises a series of ball-joint elements 51, which can be manipulated to adjust the shape of the leg, thereby to orient the housing 5 of the laser unit 10, to orient and position the laser beam(s) 2 emitted from the laser tool during use. As indicated above, the laser unit 10 embodiment of FIGS. 6 and 7 includes two laser emitters 3, configured to project mutually perpendicular laser lines 4 and 8. During use, both laser beams 2 may be emitted at the same time, to project a cross of two lines 4 and 8 on a wall 6 or other surface, or the user may choose to have only one laser beam 2 emitted, to generate a single laser line 4 or 8, for example.

As mentioned above, laser tools and laser tool systems according to the invention may additionally or alternatively comprise a laser distance measurer (LDM) and/or a laser rangefinder and/or a LIDAR tool and/or a laser scanner, for example.

In at least some embodiments of the invention, the laser tool or laser tool system may further comprise a camera in or on the housing, in or on a laser unit, and/or in or on the support, for example.

In at least some embodiments of the invention, the laser tool or laser tool system may be configured to measure and/or scan and/or map a room or other space.

In at least some embodiments of the invention, the laser tool or laser tool system may be configured to track motion external to the laser tool, e.g., by means of a camera of the laser tool, and/or to stabilize motion of the laser tool.

It is to be understood that the described and illustrated embodiments of the invention are examples, and that other embodiments fall within the scope of the claimed invention.

The invention claimed is:

1. A laser tool, comprising:
    at least one laser emitter, for emitting at least one laser beam from the tool;
    a housing, supporting and at least partially containing the laser emitter, the housing having a mounting portion configured for detachable mounting; and
    a support external to the housing, for supporting the housing, wherein the support is adjustable for orienting the housing to orient and position the laser beam, and wherein the housing is detachably mounted to the support.

2. The laser tool according to claim 1, wherein the support comprises one or more gimbal supports.

3. The laser tool according to claim 1, wherein the support has at least two non-parallel rotational axes, for adjusting the support to orient the housing to orient the laser beam.

4. The laser tool according to claim 3, wherein the non-parallel rotational axes are mutually substantially perpendicular.

5. The laser tool according to claim 4, wherein adjustment of the support to orient the housing to orient the laser beam is configured to be by one or more of substantially horizontal rotation about a substantially vertical axis, substantially vertical rotation about a first substantially horizontal axis, and substantially twisting rotation about a second substantially horizontal axis.

6. The laser tool according to claim 1, wherein the support comprises at least one arm, and wherein the mounting portion of the housing comprises clips, detents, or magnets configured to detachably mount to the support.

7. The laser tool according to claim 6, wherein the support comprises a one or more of a stabilizer and a robotic arm.

8. The laser tool according to claim 1, wherein the support is electrically adjustable with a plurality of controls positioned on the support.

9. The laser tool according to claim 3, wherein the support comprises a jointed arm, at least one joint of the jointed arm comprising a pivot enabling relative rotation between two sections of the jointed arm about a rotational axis.

10. The laser tool according to claim 9, wherein at least one pivot is a powered pivot comprising a motor.

11. The laser tool according to claim 1, further comprising one or more of an accelerometer, a gyroscope, and an inertial measurement unit (IMU), configured to enable the orientation of the laser beam.

12. The laser tool according to claim 11, further comprising at least one microprocessor configured to control adjustment of the support to orient the laser beam utilizing one or more of orientation and movement information provided by the one or more of the accelerometer, the gyroscope, and the inertial measurement unit.

13. The laser tool according to claim 1, further comprising one or more of a battery pack and a battery cell as a power source configured to power one or more of the laser emitter and a powered pivot of a jointed arm of the support.

14. The laser tool according to claim 1, wherein the laser tool comprises a laser level configured as one or more of a spot laser, a line laser, and a rotary laser that projects one or more laser beams on external surfaces.

15. The laser tool according to claim 14, wherein the laser emitter includes one or more of a substantially cylindrical lens, a substantially conical reflector, a motor to rotate the laser emitter, and a rotating reflector, to project the one or more laser beams on external surfaces.

16. The laser tool according to claim 14, wherein the laser level is configured to emit one or more laser beams in either or both of a horizontal and vertical orientation with respect to gravity.

17. The laser tool according to claim 1, further comprising one or more of a laser distance measurer (LDM), a laser rangefinder, a LIDAR tool, a laser scanner, and a camera, in or on one or more of the housing and the support.

18. A laser tool system, comprising:
(a) a laser tool comprising:
at least one laser emitter, for emitting at least one laser beam from the tool;
a housing, supporting and at least partially containing the laser emitter; and
a support external to the housing, for supporting the housing, wherein the support is adjustable for orienting the housing to orient and position the laser beam;
wherein the at least one laser emitter and the housing comprise a first laser unit, and wherein the first laser unit and the support are configured to enable the first laser unit to be detachably mounted to the support; and
(b) at least a second laser unit, comprising:
at least one second laser emitter for emitting at least one laser beam from the second laser unit; and
a second housing, supporting and at least partially containing the second laser emitter;
wherein the second laser unit and the support are configured to enable the second laser unit to be detachably mounted to the support in place of the first laser unit.

19. The laser tool according to claim 2, wherein the support comprises at least three gimbal supports, a first gimbal support rotatable about a first axis, a second gimbal support rotatable about a second axis, a third gimbal support rotatable about a third axis, the first gimble support coupled to the second gimbal support via a first arm, the second gimble support coupled to the third gimbal support via a second arm, the first arm and the second arm positionable to substantially align the first axis with the third axis, the second axis substantially orthogonal to the first axis.

20. The laser tool according to claim 8, wherein plurality of controls positioned on the support are removably attached defining a remote control device, such that the support is electrically adjustable from a remote location with the remote control device.

21. A laser tool, comprising:
one or more laser emitters configured to emit at least two perpendicular laser beams from the laser tool;
a housing partially supporting the each of the one or more laser emitters positioned therewithin; and
at least three motors connected to the housing, each of the at least three motors configured to orient the one or more laser emitters about three axes.

22. The laser tool according to claim 21, wherein the housing comprises at least two perpendicular elongated apertures positioned to emit an associated laser beam of the at least two perpendicular laser beams.

23. The laser tool according to claim 21, wherein the housing comprises an axis that aligns with at least one axis of the three axes.

24. The laser tool according to claim 21, wherein the three axes comprise at least two axes that substantially align to produce a single axis.

25. The laser tool according to claim 21, further comprising a remote control device configured to operate each of the at least three motors such that the housing is electrically adjustable from a remote location with the remote control device.

* * * * *